(12) United States Patent
Montgomery

(10) Patent No.: US 9,434,358 B2
(45) Date of Patent: Sep. 6, 2016

(54) DEBRIS REMOVAL DEVICE FOR DUAL WHEELS ON A VEHICLE

(71) Applicant: Robert Montgomery, North Las Vegas, NV (US)

(72) Inventor: Robert Montgomery, North Las Vegas, NV (US)

( * ) Notice: Subject to any disclaimer, the term of this patent is extended or adjusted under 35 U.S.C. 154(b) by 0 days.

(21) Appl. No.: 14/726,479

(22) Filed: May 30, 2015

(65) Prior Publication Data

US 2015/0344002 A1 Dec. 3, 2015

Related U.S. Application Data

(60) Provisional application No. 62/005,072, filed on May 30, 2014.

(51) Int. Cl.
*B60S 1/68* (2006.01)
*B60S 3/04* (2006.01)

(52) U.S. Cl.
CPC ................. *B60S 3/042* (2013.01); *B60S 3/045* (2013.01)

(58) Field of Classification Search
CPC ........... B60S 1/68; B60S 1/685; A61G 5/10; Y10S 297/04
See application file for complete search history.

(56) References Cited

U.S. PATENT DOCUMENTS

| 940,859 | A | * | 11/1909 | Davison | .................... B60S 1/68 |
| | | | | | 280/855 |
| 2,738,986 | A | * | 3/1956 | Pelton | ...................... B60S 1/68 |
| | | | | | 280/856 |
| 3,464,714 | A | | 9/1969 | Prillinger | |
| 7,131,670 | B2 | | 11/2006 | Kinoshita | |
| 2014/0265293 | A1 | * | 9/2014 | Lindemeier | ............... B60S 1/68 |
| | | | | | 280/856 |

* cited by examiner

*Primary Examiner* — Bryan Evans
(74) *Attorney, Agent, or Firm* — The Gray Law Group, Ltd; Robert W. Gray

(57) ABSTRACT

A debris removal device for dual wheels on a vehicle provides an elongated flat member of adjustable length, which pivots 180° about a pivot pin atop a flat base. A slender cradle is provided on the upper end of the flat member. The base is placed on the ground and the flat member is rotated upward between the dual tires. The cradle then engages a foreign object wedged between the tires, and urges the object down and outward from the wedged position.

13 Claims, 2 Drawing Sheets

DEBRIS REMOVAL DEVICE FOR DUAL WHEELS ON A VEHICLE

CROSS-REFERENCE TO RELATED APPLICATIONS

This Application claims the benefit of U.S. Provisional Application No. 62/005,072, filed May 30, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to vehicle equipment and accessories, and in particular to a debris removal device for dual wheels on a vehicle. The operators of tractor-trailer rigs, and other vehicles and trailers with dual rear wheels, have often been plagued by the problem of rocks and other debris becoming lodged between the dual wheels. This can cause serious damage to the sidewalls of both tires. A blowout at highway speeds can be catastrophic, resulting in loss of life, serious injuries, and the destruction of the tractor and trailer, the cargo, and other vehicles. Even if only replacement of the tires is required, buying and mounting two truck tires can cost $500 or more, plus towing fees. A debris removal device for dual wheels on a vehicle, which removes any rocks and other debris before damage can occur, would resolve all these problems.

SUMMARY OF THE INVENTION

Accordingly, the invention is directed to a debris removal device for dual wheels on a vehicle. The device provides an elongated flat member of adjustable length, which pivots 180° about a pivot pin atop a flat base. A slender cradle is provided on the upper end of the flat member. The base is placed on the ground and the flat member is rotated upward between the dual tires. The cradle then engages a foreign object wedged between the tires, and urges the object down and outward from the wedged position.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

Figure 1:
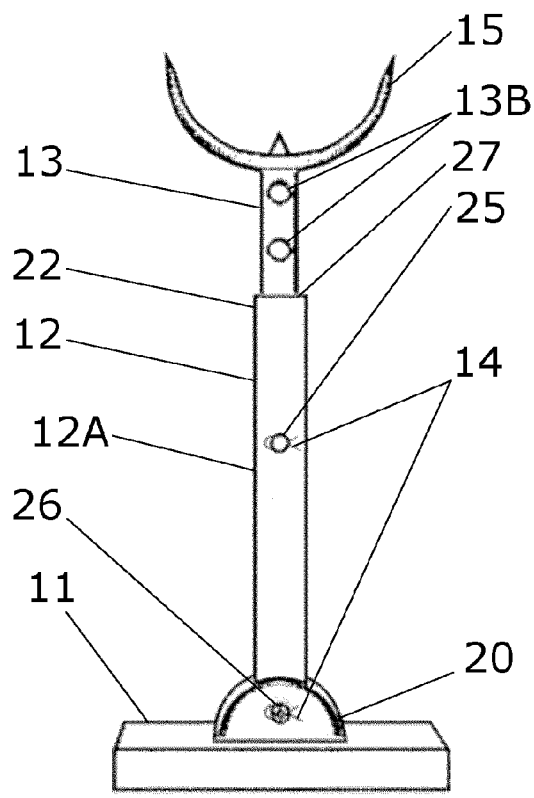
FIG. 1 is a side view of the first exemplary embodiment in the vertical position, displaying the device 10, the base 11, the pivot pin 11A, the flat member 12, the lower portion 12A, the extension portion 13, the fitting pin 13A, the holes 13B, the Cotter pins 14, and the cradle 15.
Figure 2:
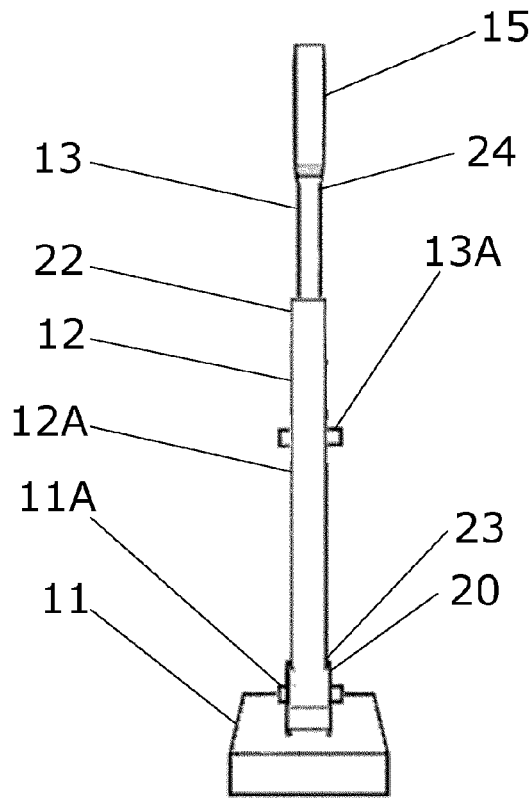
FIG. 2 is a front view of the first exemplary embodiment in the vertical position, displaying the device 10, the base 11, the pivot pin 11A, the flat member 12, the lower portion 12A, the extension portion 13, the fitting pin 13A, and the cradle 15.
Figure 3:
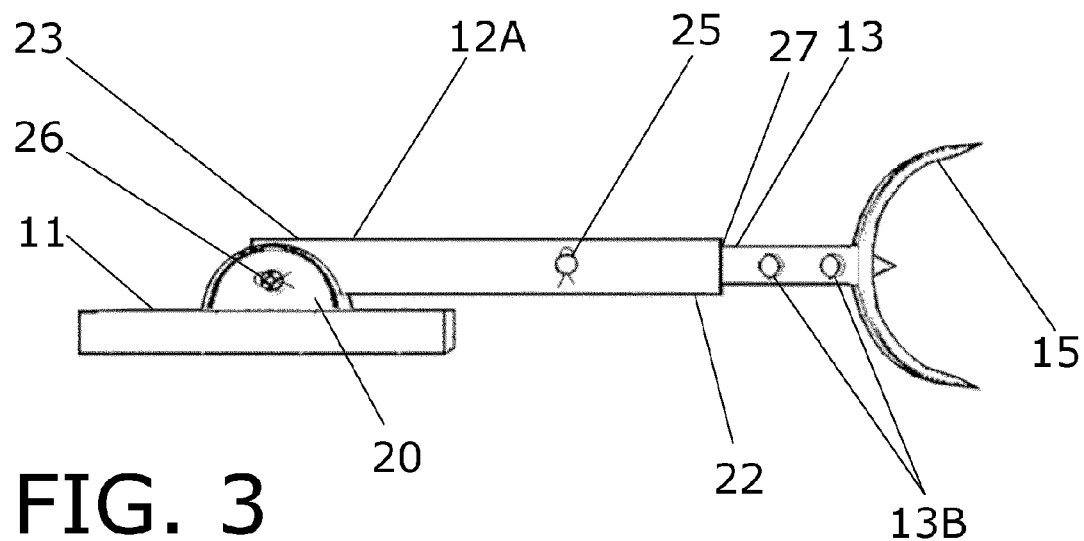
FIG. 3 is a side view of the first exemplary embodiment in the horizontal position, displaying the device 10, the base 11, the pivot pin 11A, the flat member 12, the lower portion 12A, the extension portion 13, the fitting pin 13A, the holes 13B, and the cradle 15.
Figure 4:
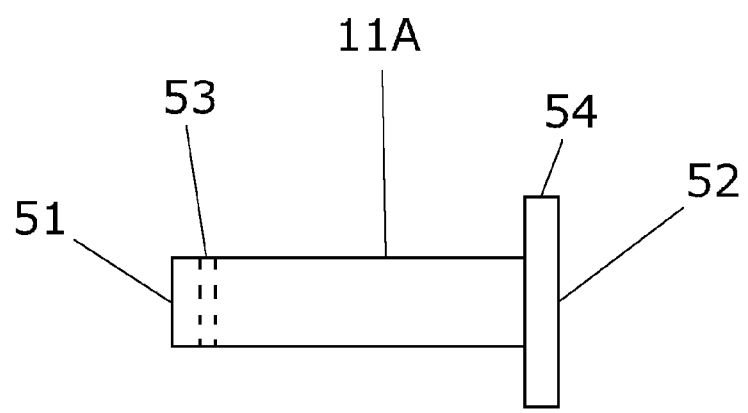
FIG. 4 is a front view of the pivot pin 11A, displaying the cotter end 51, stopper end 52, cotter hole 53, and stopper 54.
Figure 5:
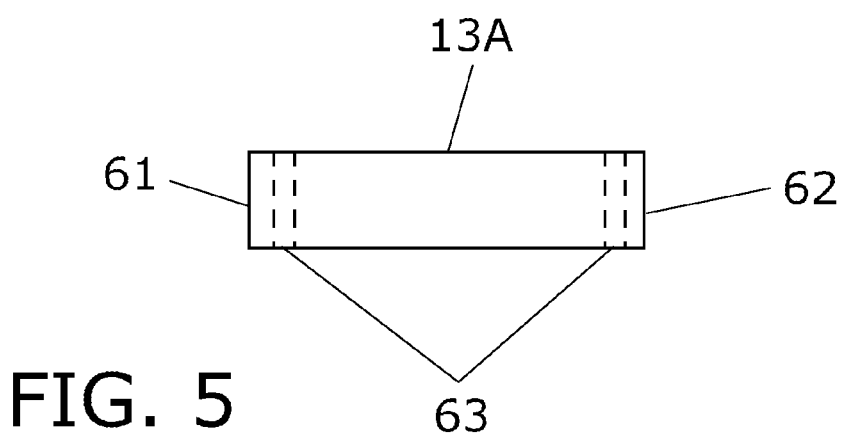
FIG. 5 is a front view of the fitting pin 13A, displaying the first end 61, the second end 62, and the cotter hole 63.

Referring now to the invention in more detail, the invention is directed to a debris removal device 10 for dual wheels on a vehicle.

The first exemplary embodiment provides an elongated flat member 12 of adjustable length, which pivots 180° about a pivot pin 11A atop a flat base 11 which provides a perpendicular pivot mount 20. The flat member 12 is comprised of a lower portion 12A, having an upper end 22 and a lower end 23, and an extension portion 13 having an upper end 24, which are removably joined together with a fitting pin 13A. The lower portion 12A provides a mount pivot pin hole 26 at a lower end 23 and a fitting pin hole 25. The extension portion 13 partially retracts down into an aperture 27 at the upper end 22 of the lower portion 12A. The extension portion 13 provides a plurality of holes 13B through which the fitting pin 13A may be inserted to adjust the overall length of the elongated flat member 12. A slender cradle 15 is provided on the upper end 24 of the extension portion 13. The pivot pin 11A and the fitting pin 13A are secured in position with Cotter pins 14.

To use the first exemplary embodiment, the user extends the extension portion 13 from the lower portion 12A of the flat member 12, such that the overall length of the flat member 12 is sufficient to engage the lodged foreign object when vertical. The user then lines up one of the holes 13B with the fitting pin 13A, and engages the hole 13B with the fitting pin 13A, then secures the fitting pin 13A in position with a Cotter pin 14. The base 11 is placed on the ground in the horizontal position, and the flat member 12 is rotated upward between the dual tires. The cradle 15 then engages a foreign object wedged between the tires. The user then drives the truck two feet backward or forward as necessary to fully engage the lodged foreign object with the cradle 15. The cradle 15 then urges the object down and outward from the wedged position.

The fitting pin 13A and the pivot pin 11A are secured in place in their respective holes. In one embodiment, the pivot pin 11A is secured in place where a stopper 54 having a larger circumference than the pivot pin 11A is affixed to the stopper end 52. A cotter hole 53 is pierced through the pivot pin 11A on a cotter end 51 of the pivot pin 11A. A cotter pin 14 is then pushed through the cotter hole 53 to secure the pivot pin 11A in place. The fitting pin 13A may be secured in the fitting pin hole 25 in the same way.

In a second embodiment, the fitting pin 13A is secured in place where a cotter hole 63 is pierced through the fitting pin 13A at both the first end 61 and the second end 62. A cotter pin 14 may then be put through each cotter pin hole 63 to secure the fitting pin 13 A in the fitting pin hole 25. The pivot pin 11A may be secured within the pivot pin hole 26 in the same way.

The base 11, the pivot pin 11A, the flat member 12, the lower portion 12A, the extension portion 13, the fitting pin 13A, the holes 13B, the Cotter pins 14, and the cradle 15 are preferably manufactured from rigid, durable materials with substantial structural strength, such as steel and aluminum alloy. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A debris removal device for dual wheels on a vehicle, comprising:
   (a) an elongated flat member;
   (b) said elongated flat member comprising a lower portion and an extension portion;
   (c) a fitting pin;
   (d) said lower portion being pierced by a fitting pin hole at an upper end and a lower portion pivot pin hole at a lower end;
   (e) said lower portion being hollow and having an aperture at an upper end;
   (f) said extension portion being of a size and shape that conforms to and fits snuggly within said aperture at an upper end such that said extension portion is not pivotally attached to said lower portion;
   (g) said extension portion having a plurality of extension holes;
   (h) said fitting pin hole and said plurality of extension holes being of the same size and shape;
   (i) said fitting pin being of a size and shape that conforms to and fits snuggly within said fitting pin hole and any one of said plurality of extension holes;
   (j) a flat base;
   (k) said flat base having a perpendicular pivot mount;
   (l) said pivot mount having a mount pivot pin hole;
   (m) a pivot pin;
   (n) said pivot pin being of a size and shape that conforms to and fits snuggly within said lower portion pivot pin hole and said mount pivot pin hole;
   (o) said extension portion having a cradle on an upper end; and
   (p) said flat base being configured to be placed on the ground and not being attached to any other structure.

2. The debris removal device for dual wheels on a vehicle of claim 1 wherein said fitting pin has a stopper end; said stopper end having a stopper;
   said stopper having a greater diameter than said fitting pin hole.

3. The debris removal device for dual wheels on a vehicle of claim 2 wherein said fitting pin has a cotter end; said cotter end having a cotter pin hole.

4. The debris removal device for dual wheels on a vehicle of claim 3 further comprising a cotter pin; said cotter pin being of a size and shape that conforms to and fits snuggly within said cotter pin hole such that said cotter pin secures said fitting pin within said fitting pin hole and one of said plurality of extension holes.

5. The debris removal device for dual wheels on a vehicle of claim 1 wherein said pivot pin has a stopper end; said stopper end having a stopper;
   said stopper having a greater diameter than said mount pivot pin hole.

6. The debris removal device for dual wheels on a vehicle of claim 5 wherein said pivot pin has a cotter end; said cotter end having a cotter pin hole.

7. The debris removal device for dual wheels on a vehicle of claim 6 further comprising a cotter pin; said cotter pin being of a size and shape that conforms to and fits snuggly within said cotter pin hole such that said cotter pin secures said pivot pin through said lower portion pivot pin hole and said mount pivot pin hole.

8. The debris removal device for dual wheels on a vehicle of claim 1 wherein said elongated flat member is configured to rotate 180 degrees around said pivot pin.

9. The debris removal device for dual wheels on a vehicle of claim 1 wherein said cradle is generally u-shaped.

10. The debris removal device for dual wheels on a vehicle of claim 1 wherein said fitting pin has a first end and a second end; a plurality of cotter pin holes; one of said plurality of cotter pin holes being located at said first end; and one of said plurality of cotter pin holes being located at said second end.

11. The debris removal device for dual wheels on a vehicle of claim 10 further comprising a plurality of cotter pins; said plurality of cotter pins being of a size and shape that conforms to and fits snuggly within said plurality of cotter pin holes such that said plurality of cotter pins secure said fitting pin through said fitting pin hole and one of said plurality of extension holes.

12. The debris removal device for dual wheels on a vehicle of claim 1 wherein said pivot pin has a first end and a second end; a plurality of cotter pin holes; one of said plurality of cotter pin holes being located at said first end; and one of said plurality of cotter pin holes being located at said second end.

13. The debris removal device for dual wheels on a vehicle of claim 12 further comprising a plurality of cotter pins; said plurality of cotter pins being of a size and shape that conforms to and fits snuggly within said plurality of cotter pin holes such that said plurality of cotter pins secure said pivot pin through said lower portion pivot pin hole and said mount pivot pin hole.

* * * * *